(12) United States Patent
Shen et al.

(10) Patent No.: US 12,520,303 B1
(45) Date of Patent: Jan. 6, 2026

(54) UPLINK DATA TRANSMISSION METHOD, TERMINAL, AND READABLE STORAGE MEDIUM

(71) Applicant: SPREADTRUM COMMUNICATIONS (SHANGHAI) CO., LTD., Shanghai (CN)

(72) Inventors: Xingya Shen, Shanghai (CN); Huan Zhou, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 547 days.

(21) Appl. No.: 17/962,833

(22) Filed: Oct. 10, 2022

Related U.S. Application Data

(63) Continuation of application No. PCT/CN2021/084913, filed on Apr. 1, 2021.

(30) Foreign Application Priority Data

Apr. 10, 2020 (CN) .......................... 202010280890.1

(51) Int. Cl.
  *H04W 52/02* (2009.01)
  *H04W 72/1268* (2023.01)
  *H04W 72/23* (2023.01)

(52) U.S. Cl.
  CPC ....... *H04W 72/1268* (2013.01); *H04W 72/23* (2023.01)

(58) Field of Classification Search
  CPC .......................... H04W 72/1268; H04W 72/23
  See application file for complete search history.

(56) References Cited

U.S. PATENT DOCUMENTS

2018/0359057 A1  12/2018  Yang et al.
2019/0132793 A1*  5/2019  Lin ................... H04W 52/0206
(Continued)

FOREIGN PATENT DOCUMENTS

CN    108289335 A    7/2018
CN    108810905 A    11/2018
(Continued)

OTHER PUBLICATIONS

International Search Report for International Application No. PCT/CN2021/084913; Date of Mailing, Jun. 25, 2021.
(Continued)

*Primary Examiner* — Atique Ahmed
(74) *Attorney, Agent, or Firm* — CANTOR COLBURN LLP

(57) ABSTRACT

Provided in the present disclosure are a method for uplink data transmission, a terminal, and a readable storage medium. The method includes: receiving uplink resource scheduling information, where the uplink resource scheduling information includes frequency domain resource allocation information, and the frequency domain resource allocation information includes interleaved resource block indication information; determining a sub-band for the uplink data transmission, in response to the frequency resource allocation information not comprising sub-band indication information; determining a resource for the uplink data transmission, based on the sub-band for the uplink data transmission and the interlaced resource block indication information; and performing the uplink data transmission.

15 Claims, 4 Drawing Sheets

(56) References Cited

U.S. PATENT DOCUMENTS

| | | | |
|---|---|---|---|
| 2019/0141734 A1* | 5/2019 | Lei | H04W 72/23 |
| 2020/0068546 A1 | 2/2020 | Wu et al. | |
| 2020/0252241 A1* | 8/2020 | Park | H04L 25/0224 |
| 2020/0313805 A1* | 10/2020 | Park | H04W 72/21 |
| 2021/0144739 A1 | 5/2021 | Jiang et al. | |
| 2021/0176028 A1* | 6/2021 | Zhou | H04W 72/23 |
| 2021/0242988 A1* | 8/2021 | Kwak | H04B 7/0626 |
| 2021/0378007 A1* | 12/2021 | You | H04L 1/1819 |
| 2022/0014314 A1* | 1/2022 | Wang | H04L 5/0055 |
| 2022/0086870 A1* | 3/2022 | Hu | H04W 72/535 |

FOREIGN PATENT DOCUMENTS

| | | | | |
|---|---|---|---|---|
| CN | 110535556 A | | 12/2019 | |
| CN | 110574312 A | * | 12/2019 | H04L 5/0091 |
| CN | 110740018 A | | 1/2020 | |
| CN | 110830194 A | | 2/2020 | |
| CN | 110831024 A | | 2/2020 | |
| KR | 20200005456 A | * | 1/2020 | H04W 74/0808 |
| WO | WO-2021204055 A1 | * | 10/2021 | H04L 1/1864 |

OTHER PUBLICATIONS

CNIPA First Office Action for corresponding CN Application No. 202010280890.1; Issue Date, Jun. 20, 2022.

EPO Extended European Search Report for corresponding EP Application No. 21783937.2; Mailing Date, Oct. 5, 2023; 11 pages.

LG Electronics, "Physical layer design of UL signals and channels for NR-U", 3GPP TSG RAN WG1 #97, R1-1906674, May 13-17, 2019, 12 pages.

Vivo, "Remaining issues on physical UL channel design in unlicensed spectrum", 3GPP TSG RAN WG1 #100, R1-2000308, e-meeting, Feb. 24-Mar. 6, 2020, 9 pages.

* cited by examiner

UPLINK DATA TRANSMISSION METHOD, TERMINAL, AND READABLE STORAGE MEDIUM

CROSS-REFERENCE TO RELATED APPLICATIONS

This application is a continuation under 35 U.S.C. § 120 of PCT/CN2021/084913, filed on Apr. 1, 2021, which is incorporated herein by reference, and which claimed priority to Chinese Patent Application No. 202010280890.1, filed on Apr. 10, 2020, and entitled "PRINTED CIRCUIT BOARD AND MANUFACTURING METHOD THEREFOR, AND TERMINAL". The present application likewise claims priority under 35 U.S.C. § 119 to Chinese Application No. 202010280890.1, filed Apr. 10, 2020, the entire content of which is also incorporated herein by reference.

TECHNICAL FIELD

The present disclosure relates to the technical field of communications, and in particular to a method for uplink data transmission, a terminal, and a readable storage medium.

BACKGROUND

In 5G New Radio (NR) unlicensed spectrum systems, a base station or terminal needs to perform Listen Before Talk (LBT) on a broadband before transmission. The base station or terminal performs LBT on N sub-bands (RB set), where N represents a ratio of a system bandwidth to a sub-band width (20 MHz), that is, $N = \lceil B_{wideband}/20 \text{ MHz} \rceil$. Transmission is performed on the sub-bands where the LBT is successful.

For uplink transmission, the terminal determines, based on scheduling information of the base station, which of the sub-bands the terminal needs to perform LBT on, and perform transmission on sub-bands indicated in the scheduling information only when the LBT is successful on all of the sub-bands indicated in the scheduling information. The scheduling information includes uplink (UL) grant information, format 0_0 or 0_1 of Downlink Control Information (DCI) (that is, DCI 0_0 or DCI 0_1).

An existing protocol specifies that DCI 0_1 in a UE Search Space (USS) includes a sub-band indicator field (RB-set indicator) indicating which sub-bands are for uplink transmission.

However, the protocol now stipulates that the DCI 0_0 in a Common Search Space (CSS) does not include the sub-band indicator field, and the DCI 0_0 in the User Search Space does not necessarily include the sub-band indicator field. The terminal is unable to determine which sub-bands are for uplink transmission without the sub-band indication field.

SUMMARY

To address the problem, a method for uplink data transmission is provided in the present disclosure. The method includes: receiving uplink resource scheduling information, where the uplink resource scheduling information includes frequency resource allocation information, and the frequency resource allocation information includes interlaced resource block indication information: determining a sub-band for the uplink data transmission based on a sub-band corresponding to a configured PUCCH resource, in response to the frequency resource allocation information not including sub-band indication information: determining a resource for the uplink data transmission, based on the sub-band for the uplink data transmission and the interlaced resource block indication information; and performing the uplink data transmission.

A terminal is further provided in an embodiment of the present disclosure. The terminal includes: a receiving unit, configured to receive uplink resource scheduling information, where the uplink resource scheduling information includes frequency resource allocation information, and the frequency resource allocation information includes interlaced resource block indication information: a first sub-band determination unit, configured to determine a sub-band for the uplink data transmission based on a sub-band corresponding to a configured PUCCH resource, in response to the frequency resource allocation information not including sub-band indication information; and a data transmission unit, configured to determine a resource for the uplink data transmission, based on the sub-band for the uplink data transmission and the interlaced resource block indication information, and perform the uplink data transmission.

A computer readable storage medium storing a computer program is further provided in an embodiment of the present disclosure. The computer program when executed by a processor is configured to implement the method according to any of the above embodiments.

DETAILED DESCRIPTION

A problem to be solved by the present disclosure is: how to determine a sub-band for uplink transmission and perform the uplink transmission in a case that scheduling information does not include a sub-band indication field.

Advantages of the technical solution compared with a conventional technology are described below.

With the above solution, in a case that scheduling information does not include a sub-band indication field, the sub-band for the uplink data transmission is determined based on a sub-band corresponding to the configured PUCCH resource. The terminal does not need to perform uplink transmission under the condition that the LBT is successful on all sub-bands. Thereby, a probability that a PUSCH transmission successfully competes for a channel is increased. Moreover, the terminal does not need to distinguish whether the received uplink resource scheduling information comes from the common search space or the user search space. Thereby, an implementation complexity for the terminal may be reduced.

In a NR unlicensed spectrum system, a system bandwidth may be divided into four sub-bands, since a sub-band has a bandwidth of 20 MHz. For example, a system with a bandwidth of 80 MHz may be divided into four sub-bands each with a bandwidth of 20 MHz.

In the NR unlicensed spectrum system, an interlace structure may be adopted for uplink transmission. Each interlace includes m physical resource blocks (PRB), which are evenly spaced in a frequency domain, with indexes of {m, M+m, 2M+m, 3M+m, . . . }, where M represents the number of interlaces. A specific definition thereof may refer to the description of the 38.211 4.4.4.6 in the 3GPP protocol.

Figure 1:
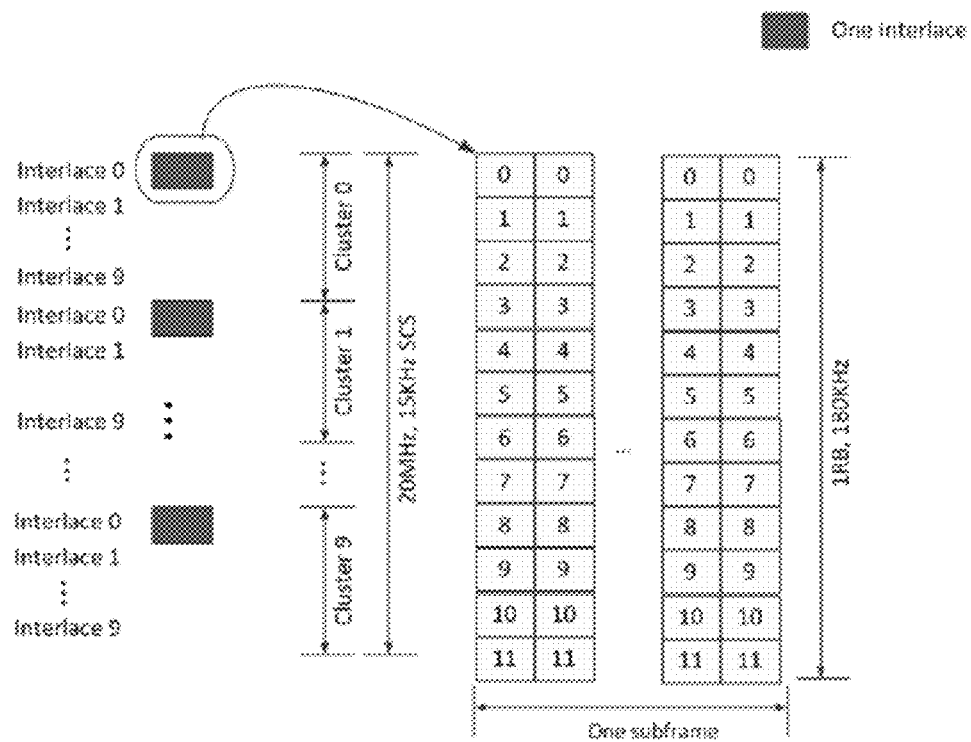
FIG. 1 shows a sub-band resource diagram with a sub-carrier interval of 15 KHZ.

For example, reference is made to FIG. 1. The bandwidth of the sub-band is 20 MHz. One physical resource block includes 12 subcarriers in the frequency domain, and a sub-frame may include multiple RBs. One sub-band may include 10 clusters, namely Cluster0 to Cluster9. Each of the clusters may be composed of multiple interlaces. For example, each of the Cluster0 to Cluster9 consists of 10 interlaces, namely interlace0 to interlace9. In a case where a subcarrier spacing (SCS) is 15 KHz, M=10, that is, the indexes of the physical resource blocks in each interlace are {m, 10+m, 20+m, 30+m, . . . }.

Figure 2:
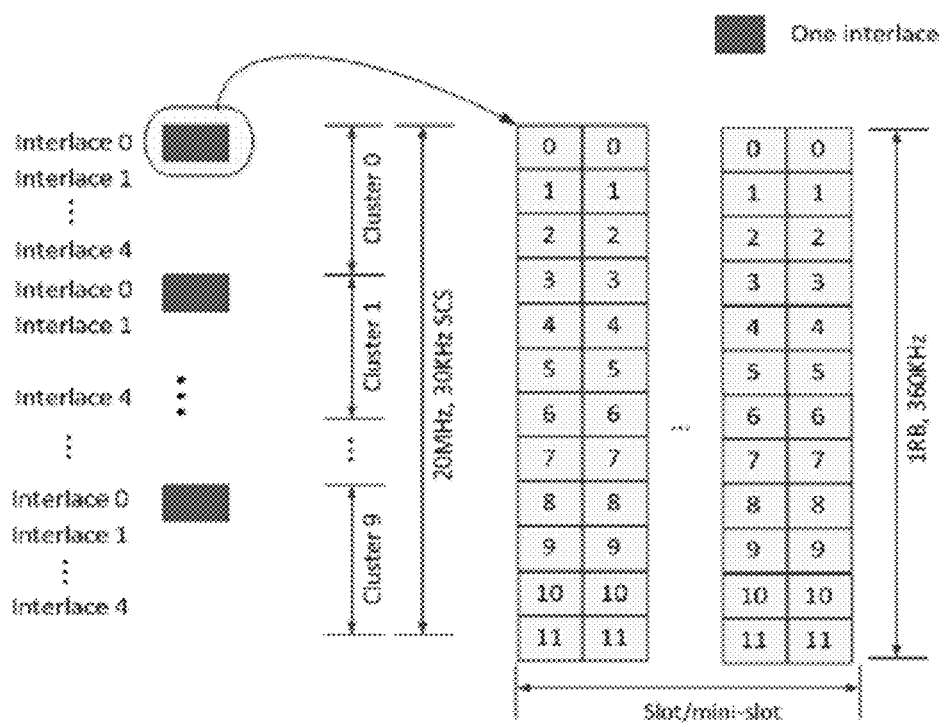
FIG. 2 shows a sub-band resource diagram with a sub-carrier interval of 30 KHZ.

Reference is made to FIG. 2. FIG. 2 is different from FIG. 1 in that: in a case where the subcarrier spacing is 30 KHz, one sub-band includes 10 clusters, but each of the clusters consists of 5 interlaces, i.e., interlace0) to interlace4. In the case that the subcarrier spacing is 30 KHz, M=5, that is, the indexes of the PRBs in each interlace are {m, 5+m, 10+m, 15+m . . . }.

In the current protocol, DCI 0_1 in a user search space includes a sub-band indicator field, which may indicate which sub-band is for uplink transmission. DCI 0_0 in a common search space does not include the sub-band indicator field, and the DCI 0_0 in the user search space does not necessarily include the sub-band indicator field.

In a case that the DCI 0_0 in the common search space does not include the sub-band indicator field, in order to enable the terminal to determine the sub-band for uplink transmission and perform uplink transmission, the following two schemes may be used.

In scheme 1, the DCI 0_0 in the user search space includes the sub-band indicator field, and thereby the terminal determines which sub-bands the terminal performs uplink transmission on according to the sub-band indicator field indicated by the base station.

In scheme 2, the DCI 0_0 in the user search space does not include the sub-band indicator field, and the terminal performs uplink transmission on all interlaces indicated in an uplink bandwidth part (BWP).

For scheme 1, since the protocol stipulates that the DCI 0_0 in the common search space does not include the sub-band indication field. In a case that the DCI 0_0 in the user search space includes the sub-band indication field, the terminal needs to distinguish whether a received DCI 0_0 is from the common search space or the user search space, and an implementation complexity may be increased. Moreover, scheme 1 does not solve how the terminal determines which sub-bands are for uplink transmission in a case that the DCI 0_0 in the common search space does not include the sub-band indication field.

For scheme 2, uplink data is to be transmitted on multiple sub-bands in a case that the uplink bandwidth includes multiple sub-bands, which means that the terminal needs to perform LBT on multiple sub-bands simultaneously. The terminal performs uplink transmission only after the LBT is successful in all the sub-bands, resulting in a decreased probability that the terminal wins in competition for an uplink channel.

Aiming at the above problems, a method for uplink data transmission is provided according to an embodiment of the present disclosure. In a case that scheduling information does not include a sub-band indication field, a sub-band for the uplink data transmission is obtained based on the sub-band corresponding to a configured Physical Uplink Control Channel (PUCCH) resource. Since succeed of LBT on all sub-bands is not a pre-condition for the terminal to perform uplink transmission, the probability of successfully occupying a channel for PUSCH transmission may be increased. Moreover, since the terminal does not need to distinguish whether the received uplink resource scheduling information is from the common search space or the user search space, the implementation complexity for the terminal may be reduced.

In order to make the objectives, characteristics and advantages of the present disclosure more apparent and easy to understand, the following embodiments of the present disclosure are illustrated in detail in combination with the drawings.

Figure 3:
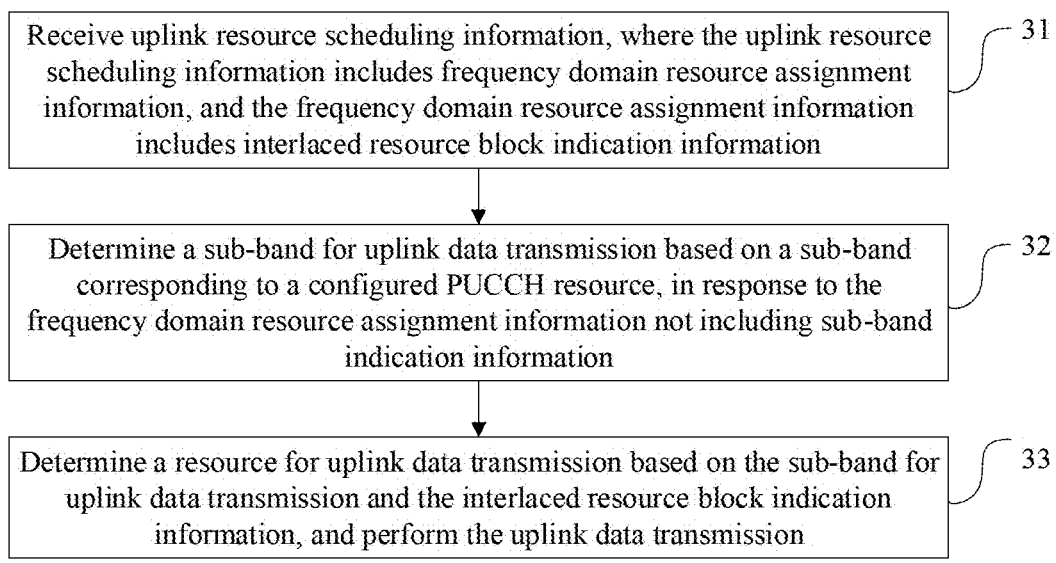
FIG. 3 shows a flow chart of a method for uplink data transmission according to an embodiment of the present disclosure.

Reference is made to FIG. 3. A method for uplink data transmission is provided according to an embodiment of the present disclosure. The method may include the following steps 31 to 32.

In 31, uplink resource scheduling information is received, where the uplink resource scheduling information includes frequency resource (resource in frequency domain) allocation information, and the frequency resource allocation information includes interlaced resource block indication information.

In an embodiment, the uplink resource scheduling information may be carried by DCI 0_0 or DCI 0_1, which is not limited.

In an embodiment, the interlaced resource block indication information is for indicating which interlace, within a bandwidth part (BWP) of the uplink transmission, may be used for the uplink transmission. After a sub-band for the uplink transmission is determined, a specific frequency resource for the uplink transmission may be determined based on the interlaced resource block indication information. The specific frequency resource for the uplink transmission is an intersection of the sub-band for the uplink transmission and the resource indicated by the interlaced resource block indication information.

In 32, a sub-band for the uplink transmission is determined based on the sub-band corresponding to a configured PUCCH resource, in response to the frequency resource allocation information not carrying sub-band indication information.

In an embodiment, in response to the frequency resource allocation information carrying the sub-band indication information, the specific frequency resource for the uplink transmission may be determined directly based on the sub-band indicated by the sub-band indication information and the interlaced resource block indication information.

In a case that the frequency resource allocation information does not carry the sub-band indication information, for example, the uplink scheduling information is DCI 0_0 in the common search space or DCI 0_0 in the user search space. In such case, the terminal may determine the sub-band for the uplink data transmission based on the sub-band corresponding to the configured PUCCH resource, that is, limit an interlaced resource block indicated in the interlaced resource block indication information to the sub-band corresponding to the PUCCH resource, so that the uplink transmission finally occurs on an intersection of the interlace indicated by the interlaced resource block indication information and the sub-band corresponding to the PUCCH resource.

The base station may assign PUCCH resources of different terminals to different sub-bands to improve resource utilization. In a case that the PUSCH transmission scheduled by DCI 0_0 is bound with a PUCCH resource assignment, the resource utilization may be improved, and a probability of congestion on the sub-bands may be reduced.

In addition, since the sub-band corresponding to the PUCCH resource is in an idle state after transmitting scheduling information, some or all of the sub-bands corresponding to the PUCCH resource is used for the uplink data transmission, and the base station is not required to assign the sub-band for the uplink data transmission to the terminal. Thereby, the resource utilization may be improved, and resource consumption of the sub-band required by the base station to send the uplink data transmission.

In an embodiment, one terminal in a cell may be configured with a single PUCCH resource or may be configured with two or more PUCCH resources. The PUCCH resources may be distributed on a same sub-band or on different sub-bands. In other words, the quantity of sub-bands corresponding to the PUCCH resource(s) may be one, or two or more.

In a case that the configured PUCCH resource corresponds to a single sub-band, according to an embodiment of the present disclosure, the sub-band corresponding to the configured PUCCH resource may be directly determined as the sub-band for the uplink data transmission.

In a case that the configured PUCCH resource corresponds to two or more sub-bands, a first preset sub-band may be determined as the sub-band for the uplink data transmission. The first preset sub-band may be set based on an actual requirement.

In an embodiment of the present disclosure, the first preset sub-band may correspond to a PUCCH resource having a maximum index value among the sub-bands corresponding to the configured PUCCH resource. That is, the interlaced resource block indicated in the interlaced resource block indication information is limited within the sub-band corresponding to the PUCCH resource with the maximum index value. Thereby, the implementation complexity for the terminal may be reduced.

In another embodiment of the present disclosure, the first preset sub-band may correspond to a PUCCH resource having a minimum index value among the sub-bands corresponding to the configured PUCCH resource. That is, the interlaced resource block indicated in the interlaced resource block instruction information is limited within the sub-band corresponding to the PUCCH resource with the minimum index value. Since the PUCCH resource with the minimum index value requires high reliability, the sub-band corresponding to such PUCCH resource is relatively reliable. Therefore, using such sub-band may increase a reliability of PUSCH transmission.

For example, the number of PUCCH resources configured in a cell is three, and index values of the PUCCH resources are PUCCH1, PUCCH2 and PUCCH3, respectively. In such case, the sub-band corresponding to PUCCH3 may be determined as the sub-band for uplink data transmission. The sub-band corresponding to PUCCH1 may be determined as the sub-band for the uplink data transmission.

In another embodiment of the present disclosure, the first preset sub-band may have a maximum index value among the sub-bands corresponding to the configured PUCCH resource. That is, the interlaced resource block indicated in the interlaced resource block indication information is limited within the sub-band with the maximum index value. Thereby, the implementation complexity for the terminal is reduced.

For example, it is assumed that the number of sub-bands corresponding to the PUCCH resource configured in a cell is three, and index values of the sub-bands are sub-band 1, sub-band 2 and sub-band 3, respectively. In this case, the sub-band corresponding to sub-band 3 may be determined as the sub-band for uplink data transmission, or the sub-band corresponding to sub-band 1 may be determined as the sub-band for the uplink data transmission.

In an embodiment, in a case that no PUCCH resource is configured in a cell, the terminal may determine the sub-band for the uplink data transmission based on the sub-bands included in the current active BWP. That is to say, some or all of the sub-bands included in the current active BWP are determined as the sub-band for the uplink data transmission, that is, the interlaced resource block indicated in the interlaced resource block indication information is limited within some or all of sub-bands included in the current active BWP.

In embodiments, the current active BWP may include a single sub-band, or two or more sub-bands. According to an embodiment of the present disclosure, the sub-band included in the current active BWP may be directly determined as the sub-band for the uplink data transmission, in response to the current active BWP including a single sub-band. That is, the interlaced resource block indicated in the interlaced resource block indication information is limited within the single sub-band included in the current active BWP.

According to an embodiment of the present disclosure, in a case that the current active BWP includes two or more sub-bands, a second preset sub-band may be determined as the sub-band for the uplink data transmission. The second preset sub-band may be configured based on an actual requirement.

In an embodiment of the present disclosure, the second preset sub-band may have a maximum index value among the two or more sub-bands included in the current active BWP. That is, the interlaced resource block indicated in the interlaced resource block indication information is limited within the sub-band with the maximum index value in the current active BWP. Thereby the implementation complexity for the terminal is reduced, and a protocol complexity is reduced.

In another embodiment of the present disclosure, the second preset sub-band may have a minimum index value among the two or more sub-bands included in the current active BWP. That is, the interlaced resource block indicated in the interlaced resource block indication information is limited within the sub-band with the minimum index value in the current active BWP. Thereby, the implementation complexity for the terminal is reduced, and the protocol complexity is reduced.

For example, it is assumed that the current active BWP includes three sub-bands, and index values of the sub-bands are sub-band 1, sub-band 2 and sub-band 3, respectively. In such case, the sub-band corresponding to sub-band 3 may be determined as the sub-band for the uplink data transmission. The sub-band corresponding to sub-band 1 may be determined as the sub-band for the uplink data transmission.

In some embodiments, the minimum index may be sub-band 0. In other embodiments, another sub-band in the current active BWP may be determined as the sub-band for the uplink data transmission, which is not limited here.

In an embodiment, in a case that a PUCCH resource is configured in a cell, the terminal may determine the sub-band for the uplink data transmission based on the sub-band included in the current active BWP. That is to say, some or all of sub-bands included in the current active BWP are determine as sub-bands for the uplink data transmission, that is, the interlaced resource block indicated in the interlaced resource block indication information is limited within the some or all of the sub-bands included in the current active BWP.

In an embodiment, the current active BWP may include a single sub-band or two or more sub-bands. According to an embodiment, in response to the current active BWP including a single sub-band, the sub-band included in the current active BWP may be directly determined as the sub-band for the uplink data transmission. That is, the interlaced resource block indicated in the interlaced resource block indication information is limited within the single sub-band included in the current active BWP.

In an embodiment of the present disclosure, in response to the current active BWP including two or more sub-bands, a second preset sub-band may be determined as the sub-band for the uplink data transmission. The second preset sub-band may be configured based on an actual requirement.

In an embodiment of the present disclosure, the second preset sub-band may have a maximum index value among the two or more sub-bands included in the current active BWP. That is, the interlaced resource block indicated in the interlaced resource block indication information is limited within the sub-band with the maximum index value in the current active BWP. Thereby, the implementation complexity for the terminal is reduced, and the protocol complexity is reduced.

In another embodiment of the present disclosure, the second preset sub-band may have a minimum index value among the two or more sub-bands included in the current active BWP. That is, the interlaced resource block indicated in the interlaced resource block indication information is limited within the sub-band with the minimum index value in the current active BWP. Thereby, the implementation complexity for the terminal is reduced, and the protocol complexity is reduced.

For example, it is assumed that the current active BWP includes three sub-bands, and index values of the sub-bands are sub-band 1, sub-band 2 and sub-band 3, respectively. In such case, the sub-band corresponding to sub-band 3 may be determined as the sub-band for the uplink data transmission. The sub-band corresponding to sub-band 1 may be determined as the sub-band for the uplink data transmission.

In some embodiments, the minimum index may be sub-band 0). In other embodiments, another sub-band in the current active BWP may be determined as the sub-band for the uplink data transmission, which is not limited here.

In an embodiment of the present disclosure, a process of determining the sub-band for the uplink data transmission based on the sub-band included in the current active BWP may include determining, in the current active BWP, a sub-band in which a DCI carrying the uplink scheduling information is located as the sub-band for the uplink data transmission, in response to the uplink data transmission occurring within a channel occupation window obtained by a base station.

In an embodiment, the channel occupation window obtained by the base station refers to a transmission opportunity obtained by the base station. Within the channel occupation window obtained by the base station, the base station schedules the uplink data transmission of the terminal through the DCI 0_0. After the terminal receives the scheduling information and determines to send a PUSCH, the sub-band in which the DCI carrying the uplink scheduling information is basically idle. In such case, the sub-band in which the DCI carrying the uplink scheduling information is determined as the sub-band for the uplink data transmission, and the base station is not required to additionally assign an uplink transmission sub-band for the terminal, which not only improves a resource utilization efficiency, but also reduces resource consumption of the sub-band required by the base station to transmit the uplink data transmission. In addition, in a case that the PUSCH transmission occurs in the sub-band where the scheduling DCI is located, the terminal needs to perform a 16 us or 25 us LBT only once, which reduces the number of LBTs in a time domain and increases the probability of accessing a channel.

In an embodiment of the present disclosure, a position of the sub-band carrying the DCI 0_0 in the frequency domain is in an uplink BWP, and the base station schedules an uplink transmission on the terminal through the DCI 0_0. In a case that the uplink data transmission occurs within the channel occupation window obtained by the base station, the interlaced resource block indicated in the interlaced resource block indication information may be limited within the sub-band carrying the DCI 0_0.

In another embodiment of the present disclosure, a position of the sub-band carrying the DCI 0_0 in the frequency domain is in an uplink BWP, and the base station schedules and uplink transmission on the terminal through the DCI 0_0. In a case that the uplink transmission occurs outside the channel occupation window obtained by the base station, the interlaced resource block indicated in the interlaced resource block indication information may be limited within the sub-band whose index is equal to an index of the sub-band carrying the DCI 0_0. Thereby, the number of LBTs performed by the terminal may be reduced.

In an embodiment, in a case that no PUCCH resource is configured in a cell, the terminal may obtain the sub-band indication information and determine the sub-band for the uplink data transmission. The sub-band indication information is carried in high-level signaling.

For example, the terminal may send a request to the base station for acquiring the sub-band indication information. After receiving the request, the base station may send the sub-band indication information to the terminal through high-level signaling. The high-level signaling may be a Radio Resource Control (RRC) signaling or a Media Access Control Layer Control Unit (MAC CE) signaling, which is not limited here.

In 33, a resource for the uplink data transmission is determined, based on the sub-band for the uplink data transmission and the interlaced resource block indication information, and the uplink data transmission is performed.

In an embodiment, after the sub-band for the uplink data transmission is determined, a resource block for the uplink transmission on the sub-band may be obtained based on the interlaced resource block indication information, and thereby the resource for the uplink transmission may be specifically determined.

It should be understood that, in the embodiments, the method for uplink data transmission may be implemented through a software program running in a processor integrated inside a chip or chip module.

It can be seen from the above that with the method for uplink data transmission, the sub-band for uplink transmission may be determined and the uplink transmission may be performed in a case that the scheduling information does not include a sub-band indication field, and thereby the probability that a PUSCH transmission successfully competes for a channel is increased and the implementation complexity for the terminal is reduced.

Figure 4:
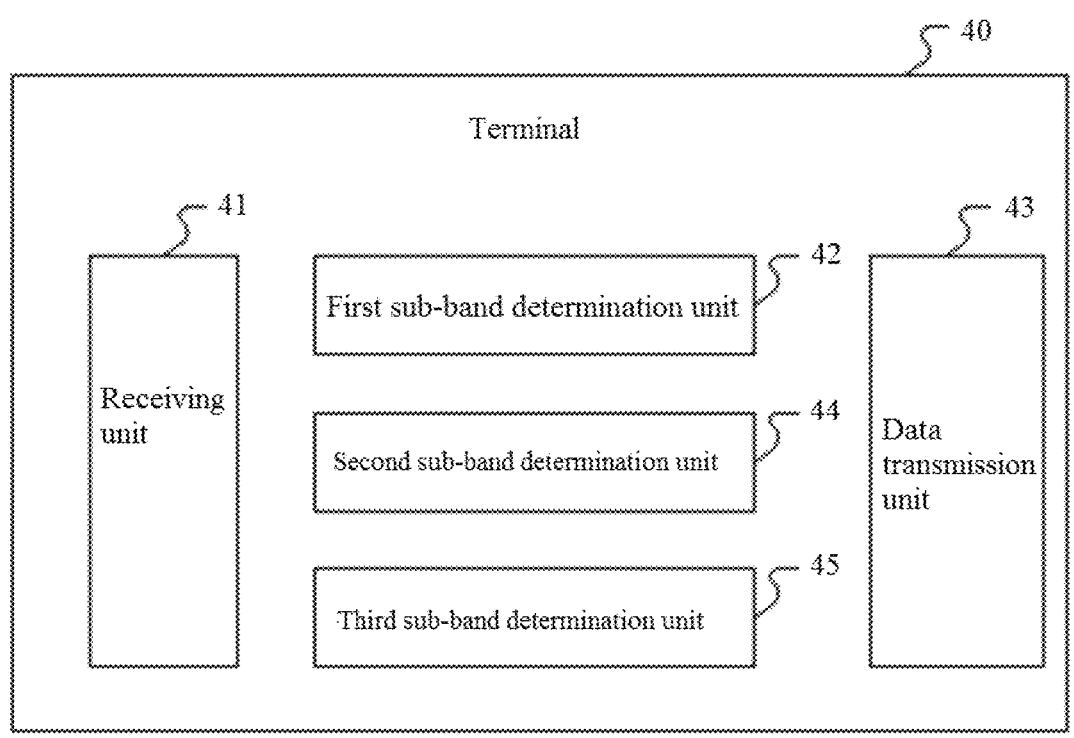
FIG. 4 shows a schematic structural diagram of a terminal according to an embodiment of the present disclosure.

In order to enable better understanding and implementation of the present disclosure for those skilled in the art, a device and a computer readable storage medium corresponding to the above method are described in detail below:

Reference is made to FIG. 4. A terminal 40 is further provided according to an embodiment of the present disclosure. The terminal 40 may include a receiving unit 41, a first sub-band determination unit 42, and a data transmission unit 43.

The receiving unit 41 is configured to receive uplink resource scheduling information. The uplink resource scheduling information includes frequency resource allocation information, and the frequency resource allocation information includes interlaced resource block indication information.

The first sub-band determining unit 42 is configured to determine a sub-band for the uplink data transmission, based on the sub-band corresponding to a configured PUCCH resource, in response to the frequency resource allocation information not including sub-band indication information.

The data transmission unit 43 is configured to determine a resource for the uplink data transmission, based on the sub-band for the uplink data transmission and the interlaced resource block indication information, and perform the uplink data transmission.

In an embodiment of the present disclosure, the first sub-band determination unit 42 is configured to: determine the sub-band corresponding to the configured PUCCH resource as the sub-band for the uplink data transmission, in response to the configured PUCCH resource corresponding to a single sub-band; and determine a first preset sub-band of sub-bands corresponding to the configured PUCCH resource as the sub-band for the uplink data transmission, in response to the configured PUCCH resource corresponding to two or more sub-bands.

In an embodiment of the present disclosure, the first preset sub-band corresponds to a PUCCH resource having a maximum index value or a minimum index value among the two or more sub-bands corresponding to the configured PUCCH resource.

In an embodiment of the present disclosure, the first preset sub-band has a maximum index value or a minimum index value among the two or more sub-bands corresponding to the configured PUCCH resource.

In an embodiment of the present disclosure, the terminal 40 may further include a second sub-band determination unit 44. The second sub-band determination unit 44 is configured to determine the sub-band for the uplink data transmission based on the sub-band in a current active BWP, in a case that no PUCCH resource is configured.

In an embodiment of the present disclosure, the second sub-band determination unit 44 is configured to: determine the sub-band in the current active BWP as the sub-band for the uplink data transmission, in response to the current active BWP including a single sub-band; and determine a second preset sub-band of sub-bands in the current active BWP as the sub-band for the uplink data transmission, in response to the current active BWP including two or more sub-bands.

In an embodiment of the present disclosure, the second preset sub-band has a maximum index value or a minimum index value among the two or more sub-bands in the current active BWP.

In an embodiment of the present disclosure, the second sub-band determination unit 44 is configured to: determine, in the current active BWP, a sub-band in which a DCI carrying the uplink scheduling information is located as the sub-band for the uplink data transmission, in response to the uplink data transmission occurring within a channel occupation window obtained by a base station.

In an embodiment of the present disclosure, the terminal 40 may further include a third sub-band determination unit 45. The third sub-band determination unit 45 is configured to: obtain the sub-band indication information and determine the sub-band for the uplink data transmission, in a case that no PUCCH resource is configured. The sub-band indication information is carried in high-level signaling.

Detailed functions of component units of the terminal of embodiments of the present disclosure may be referred to the description of corresponding parts of the data transmission method in the above embodiments of the present disclosure, which is not repeated here.

A computer readable storage medium is further provided in an embodiment of the present disclosure. The computer readable storage medium stores a computer program. The computer program is executed by a processor to perform steps of the method for uplink data transmission in the above embodiment, which is not repeated here.

In an embodiment, the computer readable storage medium may include a ROM, a RAM, a disk, a CD, or the like.

The modules/units of each device and product described in the above embodiments may be software modules/units or hardware modules/units, or partially be software modules/units and partially be hardware modules/units. For example, for each device or product applied to or integrated into a chip, each module/unit included therein may be realized through circuits or other hardware; or at least some of the modules/units may be realized through software programs running on a processor integrated inside the chip, and the remaining (if any) modules/units may be realized through circuits or other hardware. For each device or product applied to or integrated into a chip module, each module/unit included therein may be realized through circuits or other hardware. Different modules/units may be disposed in a same component (such as a chip, a circuit module, or the like) or different components of the chip module: or at least some of the modules/units may be realized through software programs running on a processor integrated inside the chip module, and the remaining (if any) modules/units may be realized through circuits or other hardware. For each device or product applied to or integrated in a terminal, each module/unit may be realized through circuits or other hardware. Different modules/units may be disposed in a same component (such as a chip, a circuit module, or the like) or different components in the terminal: or at least some of the modules/units may be realized through software programs running on a processor integrated inside the terminal, and the remaining (if any) modules/units may be realized through circuits or other hardware.

Although the present disclosure is disclosed as above, the present disclosure is not limited thereto. Various changes and modifications can be made by those skilled in the art without departing away from the spirit and scope of the present disclosure. Therefore, the protection scope of the present disclosure should be determined based on the scope defined by the claim.

The invention claimed is:

1. A method for uplink data transmission, comprising:
   receiving uplink resource scheduling information, wherein the uplink resource scheduling information comprises frequency resource allocation information, and the frequency resource allocation information comprises interlaced resource block indication information;
determining a sub-band for the uplink data transmission, in response to the frequency resource allocation information not comprising sub-band indication information;
determining a resource for the uplink data transmission, based on the sub-band for the uplink data transmission and the interlaced resource block indication information, and
performing the uplink data transmission;
wherein said determining the sub-band for the uplink data transmission comprises: determining the sub-band for the uplink data transmission based on one or more sub-bands in a current active bandwidth part (BWP);
wherein said determining the sub-band for the uplink data transmission based on the one or more sub-bands in the current active BWP comprises: determining, in the current active BWP, a sub-band in which a Downlink Control Information (DCI) carrying the uplink scheduling information is located as the sub-band for the uplink data transmission, in response to the uplink data transmission occurring within a channel occupation window obtained by a base station.

2. The method according to claim 1, wherein said determining the sub-band for the uplink data transmission based on the one or more sub-bands in the current active BWP comprises:
determining a single sub-band in the current active BWP as the sub-band for the uplink data transmission, in response to the one or more sub-bands comprising merely the single sub-band.

3. The method according to claim 1, wherein said determining the sub-band for the uplink data transmission based on the one or more sub-bands in the current active BWP comprises:
determining a second preset sub-band of two or more sub-bands in the current active BWP as the sub-band for the uplink data transmission, in response to the one or more sub-bands comprising the two or more sub-bands.

4. The method according to claim 3, wherein the second preset sub-band has a maximum index value among the two or more sub-bands.

5. The method according to claim 3, wherein the second preset sub-band has a minimum index value among the two or more sub-bands.

6. The method according to claim 1, further comprises:
obtaining the sub-band indication information, and
determining the sub-band for the uplink data transmission based on the sub-band information, wherein the sub-band indication information is carried in high-level signaling.

7. A terminal, comprising:
a memory storing instructions, and
a processor, wherein the instructions when executed by the processor configure the terminal to:
receive uplink resource scheduling information, wherein the uplink resource scheduling information comprises frequency resource allocation information, and the frequency resource allocation information comprises interlaced resource block indication information;
determine a sub-band for the uplink data transmission, in response to the frequency resource allocation information not comprising sub-band indication information;
determine a resource for the uplink data transmission, based on the sub-band for the uplink data transmission and the interlaced resource block indication information, and
perform the uplink data transmission;
wherein said determining the sub-band for the uplink data transmission comprises: determining the sub-band for the uplink data transmission based on one or more sub-bands in a current active bandwidth part (BWP);
wherein said determining the sub-band for the uplink data transmission based on the one or more sub-bands in the current active BWP comprises: determining, in the current active BWP, a sub-band in which a Downlink Control Information (DCI) carrying the uplink scheduling information is located as the sub-band for the uplink data transmission, in response to the uplink data transmission occurring within a channel occupation window obtained by a base station.

8. The terminal according to claim 7, further configured to:
determine a single sub-band in the current active BWP as the sub-band for the uplink data transmission, in response to the one or more sub-bands comprising merely the single sub-band.

9. The terminal according to claim 7, further configured to:
determine a second preset sub-band of two or more sub-bands in the current active BWP as the sub-band for the uplink data transmission, in response to the one or more sub-bands comprising the two or more sub-bands.

10. The terminal according to claim 9, wherein the second preset sub-band has a maximum index value among the two or more sub-bands.

11. The terminal according to claim 9, wherein the second preset sub-band has a minimum index value among the two or more sub-bands.

12. The terminal according to claim 7, further configured to:
obtain the sub-band indication information and determine the sub-band for the uplink data transmission based on the sub-band indication information, wherein the sub-band indication information is carried in high-level signaling.

13. A non-transitory computer-readable storage medium storing a computer program, wherein the computer program when executed by a processor is configured to:
receive uplink resource scheduling information, wherein the uplink resource scheduling information comprises frequency resource allocation information, and the frequency resource allocation information comprises interlaced resource block indication information;
determine a sub-band for the uplink data transmission, in response to the frequency resource allocation information not comprising sub-band indication information;
determine a resource for the uplink data transmission, based on the sub-band for the uplink data transmission and the interlaced resource block indication information, and
perform the uplink data transmission;
wherein said determining the sub-band for the uplink data transmission comprises: determining the sub-band for the uplink data transmission based on one or more sub-bands in a current active bandwidth part (BWP);
wherein said determining the sub-band for the uplink data transmission based on the one or more sub-bands in the current active BWP comprises: determining, in the current active BWP, a sub-band in which a Downlink Control Information (DCI) carrying the uplink scheduling information is located as the sub-band for the uplink data transmission, in response to the uplink data transmission occurring within a channel occupation window obtained by a base station.

14. The non-transitory computer-readable storage medium according to claim 13, wherein the computer program when executed by a processor is configured to:
determine a second preset sub-band of two or more sub-bands in the current active BWP as the sub-band for the uplink data transmission, in response to the one or more sub-bands comprising the two or more sub-bands.

15. The non-transitory computer-readable storage medium according to claim 14, wherein
the second preset sub-band has a maximum index value or a minimum index value among the two or more sub-bands.

* * * * *